Figure 1:
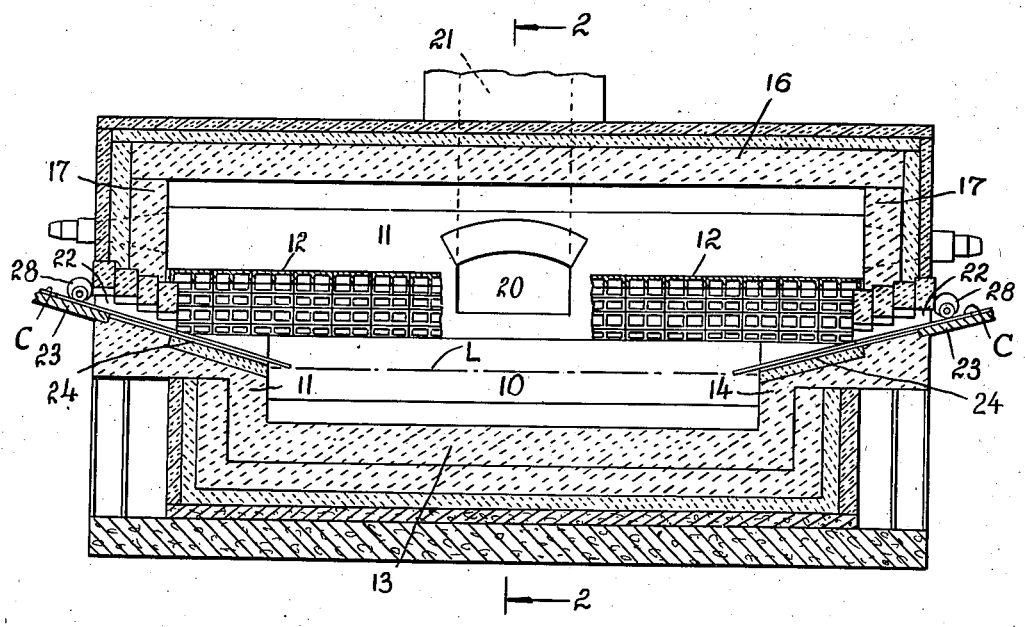

Oct. 6, 1942.    P. M. HULME ET AL    2,298,055

MELTING COPPER

Filed April 5, 1941

INVENTORS
PHILIP M. HULME
ROBERT A. GHELARDI
BY
ATTORNEYS

Patented Oct. 6, 1942

2,298,055

UNITED STATES PATENT OFFICE 2,298,055

MELTING COPPER

Philip M. Hulme and Robert A. Ghelardi, Perth Amboy, N. J., assignors to International Smelting and Refining Company, a corporation of Montana Application April 5, 1941, Serial No. 386,986

8 Claims. (Cl. 75—65)

This invention relates to the melting of copper, and more particularly to the melting of copper chiefly by radiant heat. The invention has for its principal object the provision of an improved method for melting copper chiefly by radiant heat.

Proposals have heretofore been made to melt copper largely by radiant heat, as, for example, in the United States patent to Betterton No. 2,065,207. The melting procedure of such prior proposals has involved introducing the solid copper to be melted into a pool or bath of molten copper which is maintained in the molten state largely by radiant heat. Upon introduction into the molten bath, the solid copper sinks and hence substantially all of the heat required to melt the solid copper must be supplied by radiation to the surface of the molten bath.

In contrast with such prior proposals, the present invention contemplates exposing solid copper to be melted to a source of radiant heat which is at a temperature at least approximately as high as the melting temperature of copper. The solid copper is maintained thus exposed until it becomes heated from its initial relatively low temperature to an elevated temperature approaching its melting point. The heated but still solid copper is then introduced into a bath of molten copper which is maintained in the molten state largely by radiant heat. Thus, in accordance with the invention, the heat required to raise the copper substantially to its melting point is supplied largely by radiation to the solid copper, and only approximately the heat of fusion is supplied by radiation to molten copper.

In heating and melting copper by radiant heat, the rate at which heat is transferred from the source of radiant heat to the copper being heated may be expressed by the equation $$q = K \times A \times \frac{1}{\frac{1}{E_1}+\frac{1}{E_2}-1}(T_1^4 - T_2^4)$$

in which $q$ = Net rate of radiant heat transfer;
$A$ = Area of radiating surface;
$E_1$ = Emissivity of radiating surface;
$E_2$ = Emissivity of absorbing surface;
$T_1$ = Absolute temperature of radiating surface; and
$T_2$ = Absolute temperature of absorbing surface.

If it is assumed that the emissivity of the radiating surface is unity, then the foregoing equation may be rewritten to express the rate of heat transfer per unit of heat radiating area ($q_1$) as follows:

$$q_1 = KE_2(T_1^4 - T_2^4)$$

From the latter equation it is seen that the rate of heat transfer is proportional to the emissivity of the copper being heated.

We have found that the emissivity of copper in the solid state is very much greater than the emissivity of molten copper. The emissivity of molten copper is only about 0.16, whereas the emissivity of solid copper in the form of commercial copper cathodes is about 0.6. In consequence of this difference in emissivities, solid copper will absorb radiant heat at a much higher rate than molten copper.

Based on these findings, the present invention provides an improved method for melting copper by means of which the melting rate of the copper is increased substantially over heretofore known melting methods. Briefly stated, the method of the invention comprises exposing solid, relatively cold copper to a source of radiant heat at a temperature at least as approximately as high as the melting temperature of copper, maintaining the solid copper thus exposed until it has been heated to a temperature approaching its melting point, and introducing the thus-heated copper while still in the solid state into a bath of molten copper wherein said heated solid copper is melted by heat transferred to said bath chiefly by radiation.

It will be observed that the increased melting rate obtainable in accordance with the invention is greater than can be achieved by simple preheating. The preheating of copper preparatory to melting has been proposed heretofore, as, for example, in the United States patent to Lukens et al. No. 1,733,419. The proposal set forth in the Lukens et al. patent (and other similar proposals) involves passing hot combustion gases in contact with solid copper preparatory to introducing the copper into a melting chamber heated by the combustion gases. Such a preheating operation takes advantage of the relatively large mean temperature difference between the combustion gases and cold solid copper, which mean temperature difference is substantially greater than the mean temperature difference between the combustion gases and a bath of molten copper. As will be apparent from a consideration of the equations given above, the method of the invention takes advantage of this greater mean temperature difference between the solid copper and the source of heat, in addition to taking advantage of the higher emissivity of solid copper.

The melting method of the invention is of particular utility for melting copper under conditions inhibiting contamination thereof. Thus, copper may be melted in accordance with the invention chiefly by radiant heat in an atmosphere substantially free of contaminants injurious to heated or molten copper. Such an atmosphere preferably consists essentially of carbon monoxide and nitrogen.

The heated copper is introduced into a bath of molten copper while still in the solid state in order to promote efficient melting. The heated solid copper, being of greater density than molten copper, sinks to the bottom of the bath and there melts more rapidly than it would if allowed to melt first and flow in the molten state into the bath. There is no advantage in keeping the copper out of the bath until it melts, because as soon as drops of molten metal cover the surface, the emissivity drops to the value of molten copper and the heating rate drops correspondingly. By immersing the heated but still solid copper into the bath of molten copper, the former is speedily melted by intimate contact with the molten material. The heat required for fusion is drawn from the reserve of heat in the molten bath and is replaced by radiation or other mode of transfer from the heating source to the bath.

Figure 2:
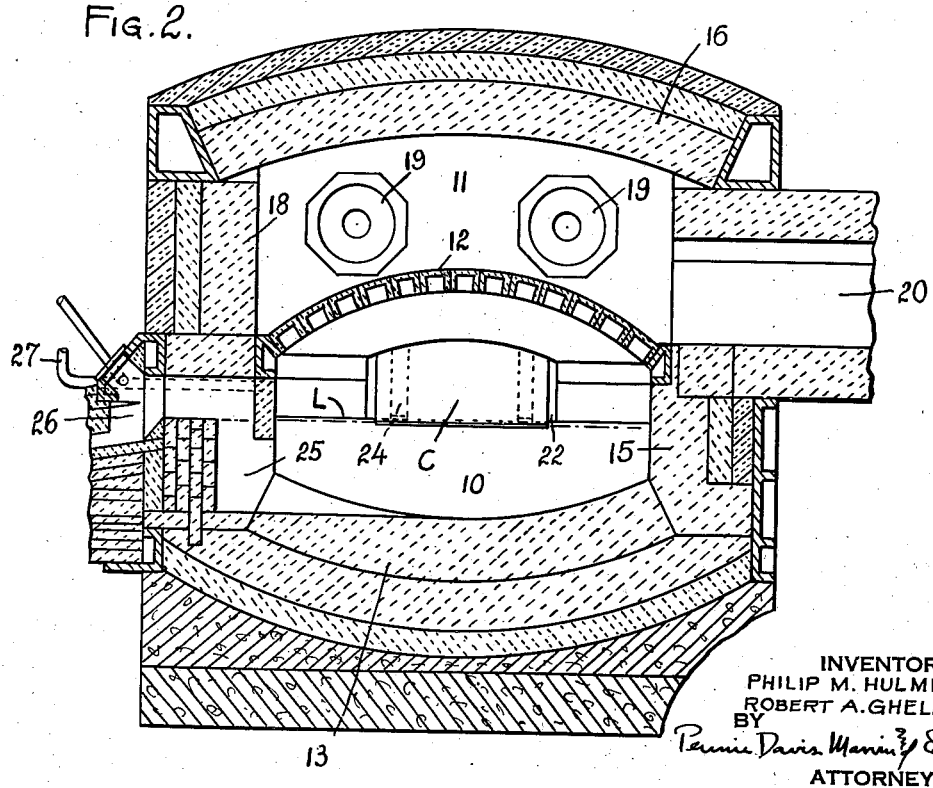

The invention will be better understood from the following detailed description considered in conjunction with the accompanying drawing, in which Fig. 1 is a longitudinal section through a furnace adapted for carrying out the method of the invention; and Fig. 2 is a vertical section taken substantially along the line 2—2 of Fig. 1.

The furnace shown in the drawing is a fuel fired muffle furnace having a melting chamber 10 separated from a combustion chamber 11 by a refractory arch 12. The melting chamber has a bottom or floor 13, end walls 14, and side walls 15 of more or less standard refractory construction. The combustion chamber likewise is enclosed by a refractory roof 16, refractory end walls 17, and refractory side walls 18. Fuel is introduced into the combustion chamber through burners 19, and is burned in the combustion chamber so as to heat the arch 12 to an elevated temperature, preferably a temperature substantially above the melting point of copper. The combustion gases are withdrawn from the combustion chamber through a centrally located flue 20 and uptake 21.

A pool of molten copper is maintained in the melting chamber 10 and kept approximately to a depth indicated by the normal metal line L. This pool of copper is maintained at a suitable temperature above the melting point of copper chiefly by heat radiated from the heated muffle arch 12, although some heat is of course conducted to the molten metal through the refractory along the side wall.

Copper, advantageously in the form of commercial copper cathodes C, is introduced into the melting chamber 10 of the furnace through charging slots 22 located in the furnace end walls. In charging, the cathodes are deposited on an inclined rack 23, and each cathode is pushed by those behind it downwardly along the rack through the charging slot and on to an inclined table or ledge 24 located within the furnace under the heated arch 12. The cathodes lie for a short period of time on tables or ledges 24, and in this position they receive directly heat radiated from the arch 12. Owing to the high emissivity of the solid cathodes, they absorb radiant heat at a relatively high rate, and so are quickly heated from the initial charging temperature almost to the melting point. The heated but still solid cathodes are then pushed into the bath of molten copper.

For most efficient operation it is desirable that the cathodes remain on the ledges 24 until they have been heated nearly to the melting point, but little or no advantage is derived by keeping them longer in this position. As soon as the surface of the cathodes begins to melt, the mechanical difficulty of pushing them into the molten bath without buckling or jamming is increased, and at the same time the emissivity of the cathodes begins to drop on account of the droplets, or sweat, of molten copper that forms on cathode surface. If the cathodes are pushed into the bath of molten copper after being heated almost to the melting point but while still solid, they sink, and in the intimate contact of submergence in the molten metal they are quickly melted by the reserve of heat in the molten bath. The relatively small amount of heat thus supplied to the cathodes by the bath is made up rapidly enough largely by radiation directly to the bath.

It is understood that under some conditions of operation it may be undesirable or impractical to push the cathodes into the bath of molten metal before they have become partially or completely melted. For example, if the rate at which molten copper is withdrawn from the furnace drops off considerably, it may be necessary to charge the cathodes at a rate so slow that the cathodes on the ledges 24 become partially or completely melted before the next cathode is advanced.

Molten copper is withdrawn from the melting chamber 10 through a tapping hole 25, and thence overflows into a launder 26, through which it is passed to suitable casting equipment.

The melting method of the invention is well adapted for use in cases where copper is melted under conditions inhibiting contamination of the copper, that is, by melting the copper in an atmosphere substantially free of injurious contaminants. To this end the atmosphere in the melting chamber 10 above the surface of the molten copper may be a gas mixture consisting essentially of carbon monoxide and nitrogen. Such a gas mixture may be introduced through a pipe 27 communicating with the interior of the melting chamber. In order to prevent excessive loss of the gaseous atmosphere through the charging slots 22, suitable seals 28, which may be of the type described in our copending application Serial No. 362,956, filed October 26, 1940, may be mounted at the entrances to the slots.

The melting rate for melting copper largely by radiant heat may be very materially increased by the method of the invention. A consideration of the specific heat content of copper at various temperatures will serve to demonstrate the extent of the increased melting rate theoretically obtainable. For example, to heat one pound of copper from a temperature of about 100° F. to a temperature closely approaching its melting point requires absorption by the copper of approximately 190 B. t. u. To melt the thus-heated copper and raise its temperature to about 2200° F. (an average casting temperature) requires absorption by the copper of an additional 125 B. t. u. In accordance with methods heretofore proposed for melting copper by radiant heat, all of this heat (about 325 B. t. u.) had to be supplied by radiation to the relatively unreceptive surface of molten copper. In accordance with the method of the invention, however, the greater part of the required heat is supplied largely by radiation directly to the solid copper. In melting cathodes having an emissivity of about 0.6 under a muffle arch having theoretically perfect emissivity, it is possible to supply the 190 B. t. u. required for heating the metal to the melting point at a rate almost four times as fast as if the cold copper is charged directly into the molten pool.

We have found in actual operation of a furnace that the theoretical improvements of the invention are amply achieved in practice. In a furnace in which the emissivity of the muffle arch 12 is about 0.9, solid cathode copper on the ledge 24 is heated largely by radiant heat from its initial temperature almost to the melting temperature at a rate about three times as fast as if the cold solid copper is charged directly into the molten bath.

It is understood that the foregoing description of a specific embodiment of the invention with particular reference to a furnace constructed as shown in the drawing is by way of illustration only. The invention may be carried out with beneficial results in furnaces of many different designs, and in various manners. To secure in some measure the advantages of the invention it is necessary only to make provision for exposing the solid metal to a source of radiant heat for a sufficient period of time to enable it to be heated almost to the melting point before introducing it into a bath of the molten metal.

We claim:

1. The method of melting copper chiefly by radiant heat which comprises exposing solid, relatively cold copper to be melted to a source of radiant heat at a temperature at least approximately as high as the melting temperature of copper, maintaining the solid copper thus exposed until it is heated to a temperature approaching its melting temperature, whereby advantage is taken of the relatively high emissivity of solid copper in heating the copper from its initial temperature to the temperature approaching its melting point, and thereafter introducing the heated but still solid copper into a bath of molten copper wherein said heated solid copper is melted by heat transferred to said bath chiefly by radiation.

2. The method of melting copper under conditions inhibiting contamination thereof which comprises exposing solid, relatively cold copper in an atmosphere substantially free of injurious contaminants to a source of radiant heat at a temperature at least approximately as high as the melting temperature of copper, maintaining the solid copper thus exposed until it is heated to a temperature approaching its melting temperature, and introducing the thus-heated copper while still in the solid state into a bath of molten copper wherein said heated solid copper is melted by heat transferred to said bath chiefly by radiation.

3. The method of melting copper which comprises exposing solid relatively cold copper to a source of radiant heat at a temperature at least approximately as high as the melting temperature of copper, maintaining the solid copper thus exposed until it has become heated to a temperature approaching its melting point, and introducing the thus-heated copper while still in the solid state into a bath of molten copper wherein said heated solid copper is melted by heat transferred to said bath chiefly by radiation.

4. The method of melting copper chiefly by radiant heat which comprises exposing solid, relatively cold copper to a source of radiant heat at a temperature at least approximately as high as the melting temperature of copper, maintaining the solid copper thus exposed until it has become heated to a temperature approaching its melting point, and introducing the thus-heated copper while still in the solid state into a bath of molten copper exposed to and maintained in the molten state chiefly by radiant heat, whereby the heat required to heat the copper from its initial temperature nearly to its melting point is supplied largely by radiation directly to solid copper, and in melting the copper only approximately its heat of fusion is supplied by radiation to molten copper.

5. The method of melting copper chiefly by radiant heat and under conditions inhibiting contamination of the copper which comprises exposing solid, relatively cold copper in an atmosphere substantially free of injurious contaminants to a source of radiant heat at a temperature at least approximately as high as the melting temperature of copper, maintaining the copper thus exposed in said atmosphere until it has been heated to a temperature approaching its melting temperature, and introducing the thus-heated copper while still in the solid state into a bath of molten copper under an atmosphere free of injurious contaminants, said molten copper being exposed to and maintained in the molten state chiefly by a source of radiant heat at a temperature higher than the melting point of copper, whereby the heat required to heat the copper from its initial temperature nearly to its melting point is supplied largely by radiation directly to the solid copper, and in melting the copper only approximately its heat of fusion is supplied by radiation to molten copper.

6. The method of melting copper under conditions inhibiting contamination thereof which comprises exposing solid, relatively cold copper in an atmosphere consisting essentially of carbon monoxide and nitrogen to a source of radiant heat at a temperature at least approximately as high as the melting temperature of copper, maintaining the solid copper thus exposed until it is heated to a temperature approaching its melting temperature, and introducing the thus-heated copper while still in the solid state into a bath of molten copper wherein said heated solid copper is melted by heat transferred to said bath chiefly by radiation.

7. The method of melting commercial copper cathodes which comprises exposing the solid cathodes while relatively cold to a source of radiant heat at a temperature at least approximately as high as the melting point of copper, maintaining the solid cathodes thus exposed until they have become heated to a temperature approaching their melting point, and introducing the thus-heated cathodes while still in the solid state into a bath of molten copper wherein said heated solid cathodes are melted by heat transferred to said bath chiefly by radiation.

8. The method of melting commercial copper cathodes under conditions inhibiting contamination thereof which comprises exposing the solid relatively cold cathodes in an atmosphere substantially free of injurious contaminants to a source of radiant heat at a temperature at least approximately as high as the melting point of copper, maintaining the solid cathodes thus exposed until they have become heated to a temperature approaching their melting point, and introducing the thus-heated cathodes while still in the solid state into a bath of molten copper wherein said heated solid cathodes are melted by heat transferred to said bath chiefly by radiation.

PHILIP M. HULME.
ROBERT A. GHELARDI.